W. M. HOLLOWAY.
ADDING MACHINE.
APPLICATION FILED OCT. 25, 1912.

1,337,599.

Patented Apr. 20, 1920.
8 SHEETS—SHEET 3.

Witnesses:
Wm. Geiger
Pearl Adams

Inventor:
William M Holloway
By Munday, Evarts, Adcock & Clarke,
His Attys.

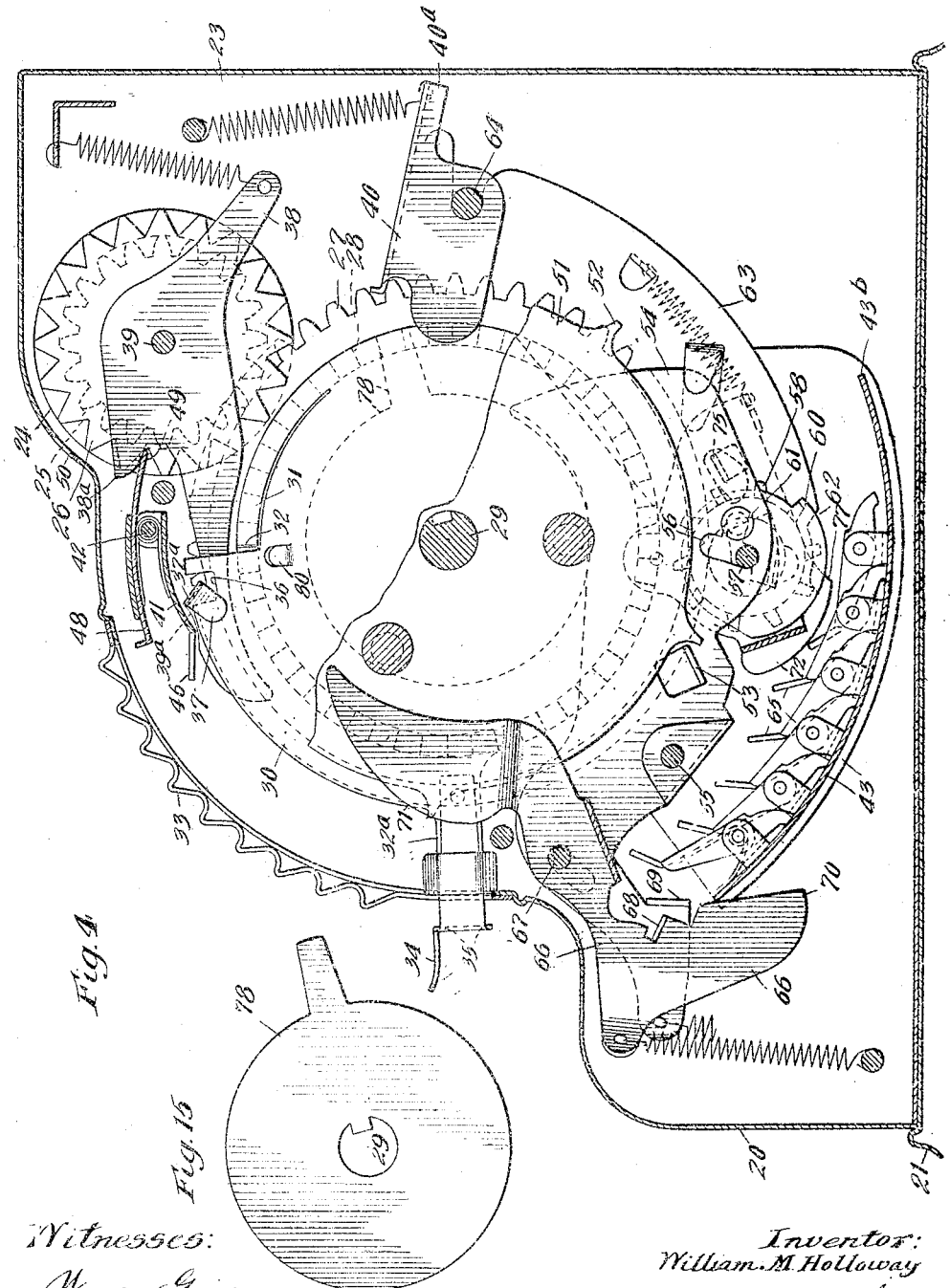

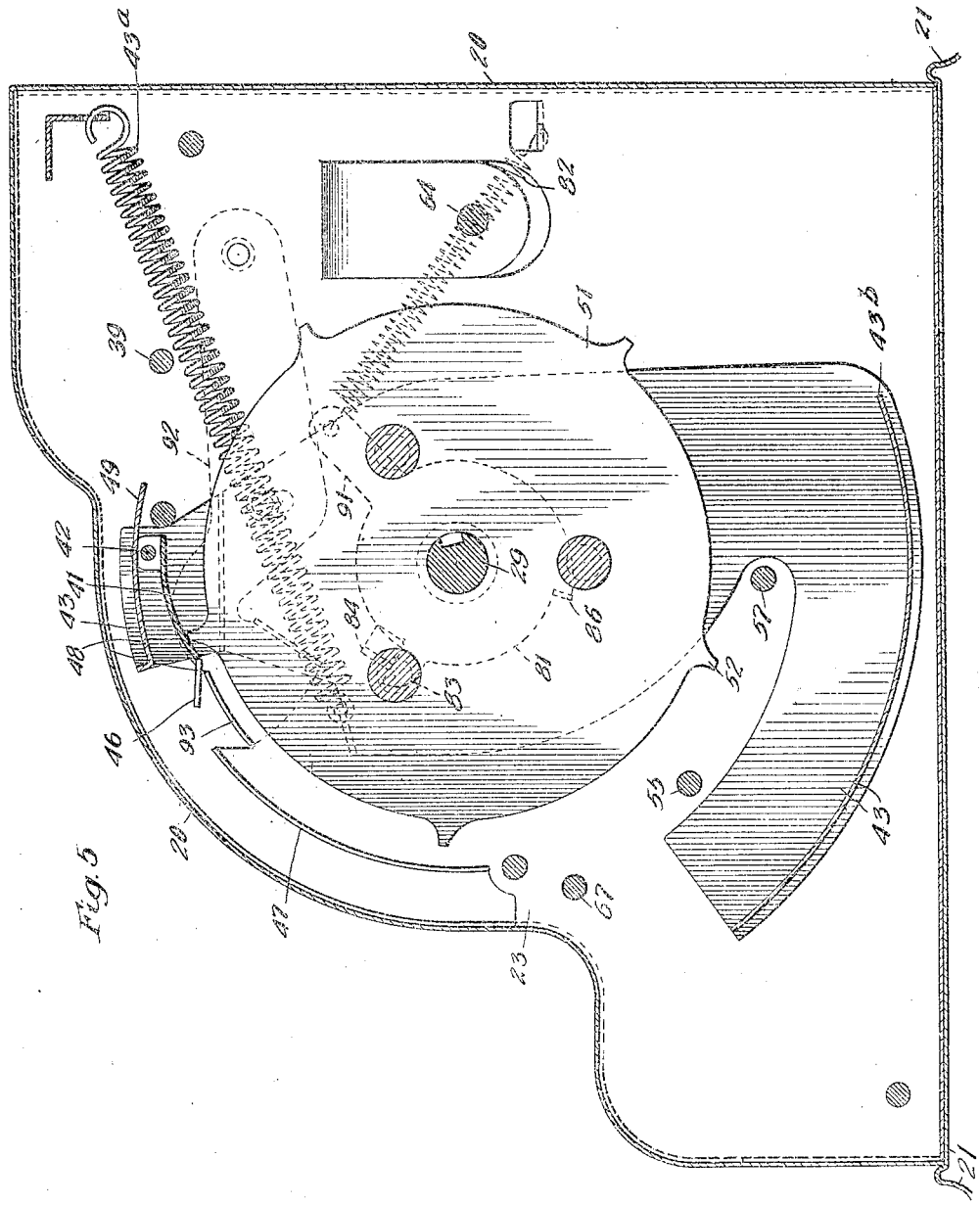

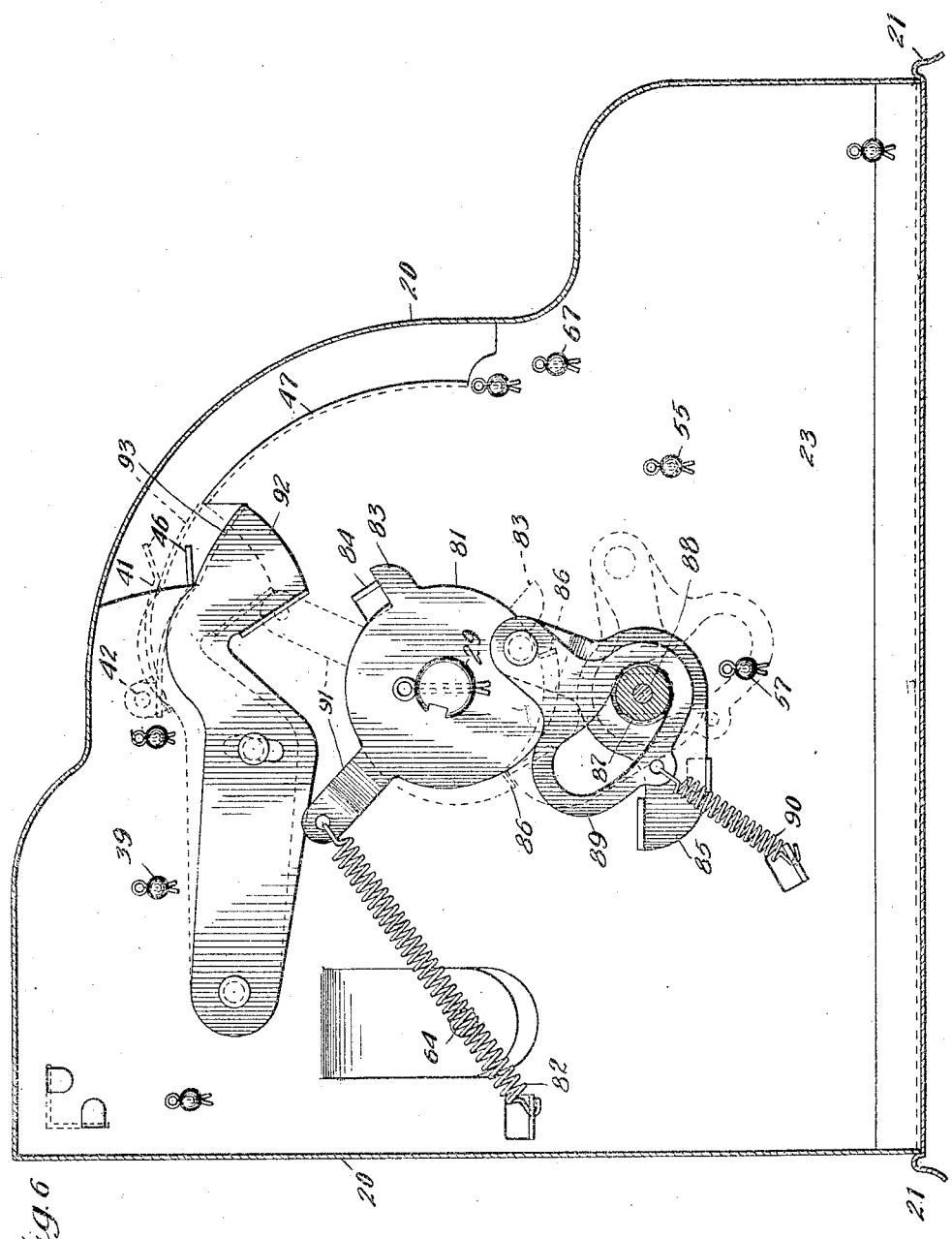

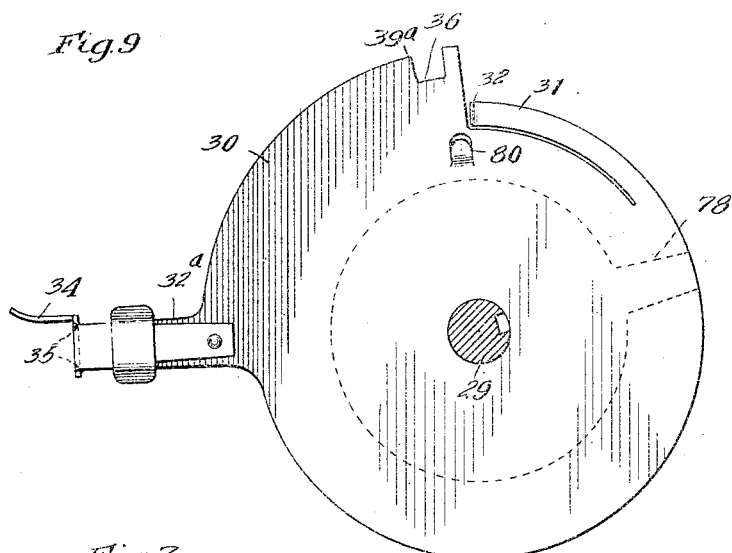
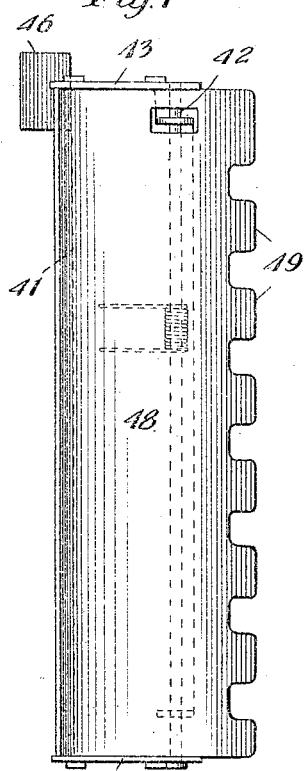
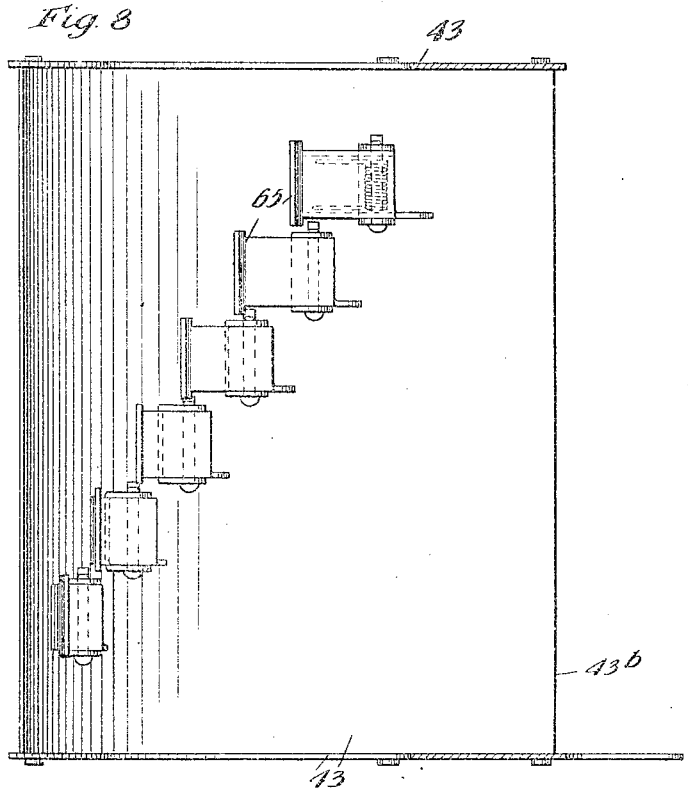

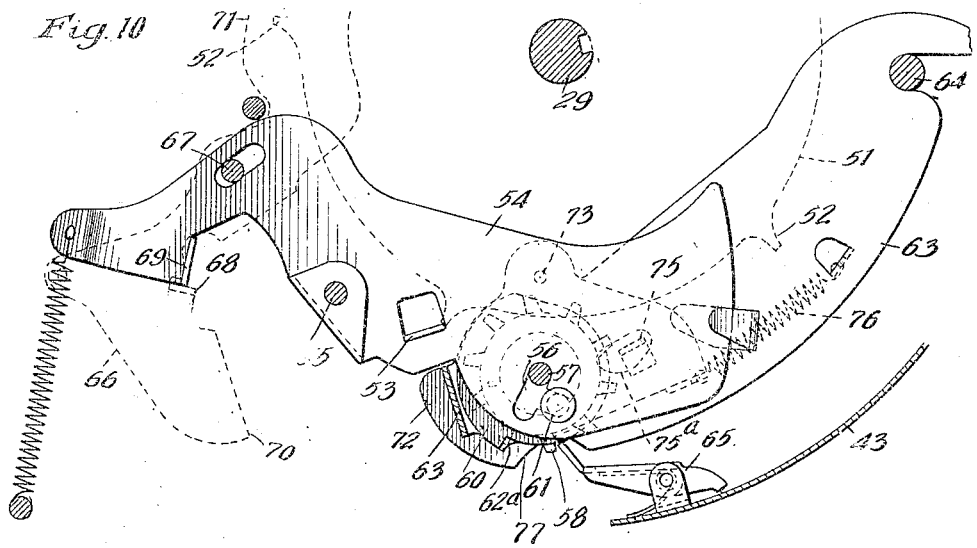
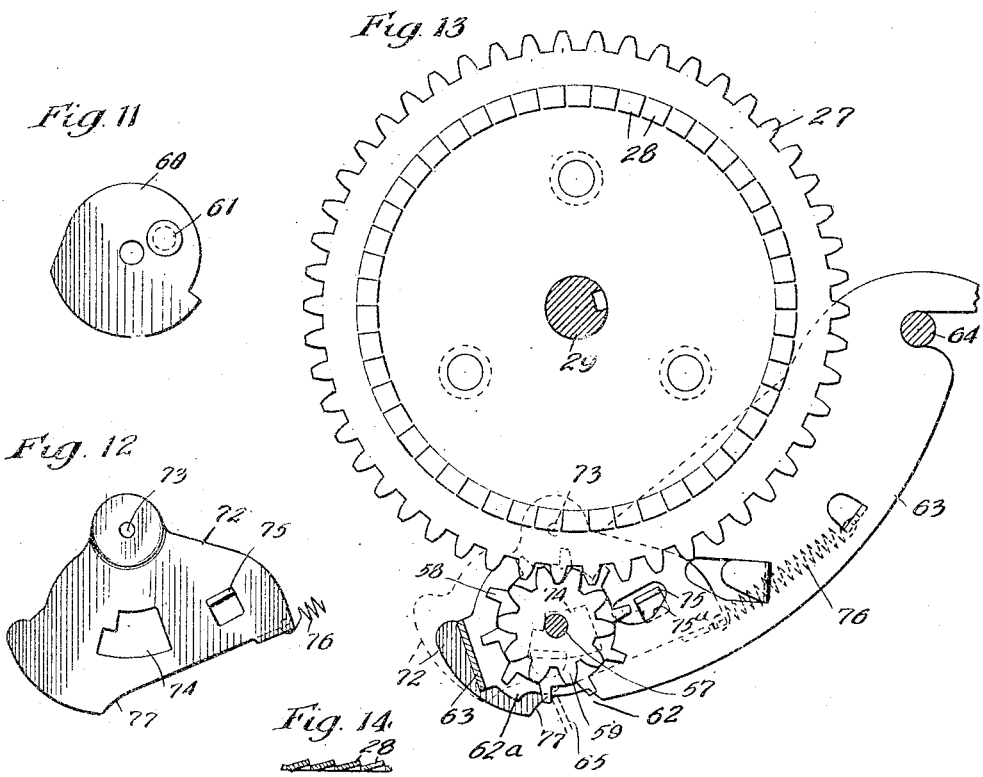

UNITED STATES PATENT OFFICE.

WILLIAM M. HOLLOWAY, OF AUSTIN, ILLINOIS, ASSIGNOR TO CHARLES W. SHONK COMPANY, OF CHICAGO, ILLINOIS, A CORPORATION OF NEW JERSEY.

ADDING-MACHINE.

1,337,599.  Specification of Letters Patent.  Patented Apr. 20, 1920.

Application filed October 25, 1912. Serial No. 727,732.

*To all whom it may concern:*

Be it known that I, WILLIAM M. HOLLOWAY, a citizen of the United States, residing in Austin, in the county of Cook and State of Illinois, have invented a new and useful Improvement in Adding-Machines, of which the following is a specification.

This invention relates to improvements in adding machines.

One object of the invention is to provide a practical, accurately registering adding machine of compact form, cheap to manufacture and adapted to perform the work of much higher priced adding machines now on the market.

Another object of the invention is to provide an adding machine in which the manipulation of a single oscillating means will effect all the prime actuations, transferring or carrying, and canceling.

Further objects of the invention are; to provide an adding machine employing a series of set-up levers which determine the amounts to be added, with means, optionally operable, for disconnecting the set-up levers, from operative relation with the register-wheel actuating-connections and adapted to return the set-up levers to normal position, whenever this is desired, without in any way affecting the condition of the register-wheels; to provide an adding machine of the type above indicated with checks or controls or stops that will prevent either accidental or intentional incorrect sequence of manipulation of any of the parts and also prevent overthrow of the parts; and to provide means whereby the set-up levers may be locked and rendered inoperable whenever it is desired.

The invention furthermore consists in the improvements in the parts and devices and in the novel combinations of the parts and devices as hereinafter more particularly described, shown or claimed.

Figure 1:
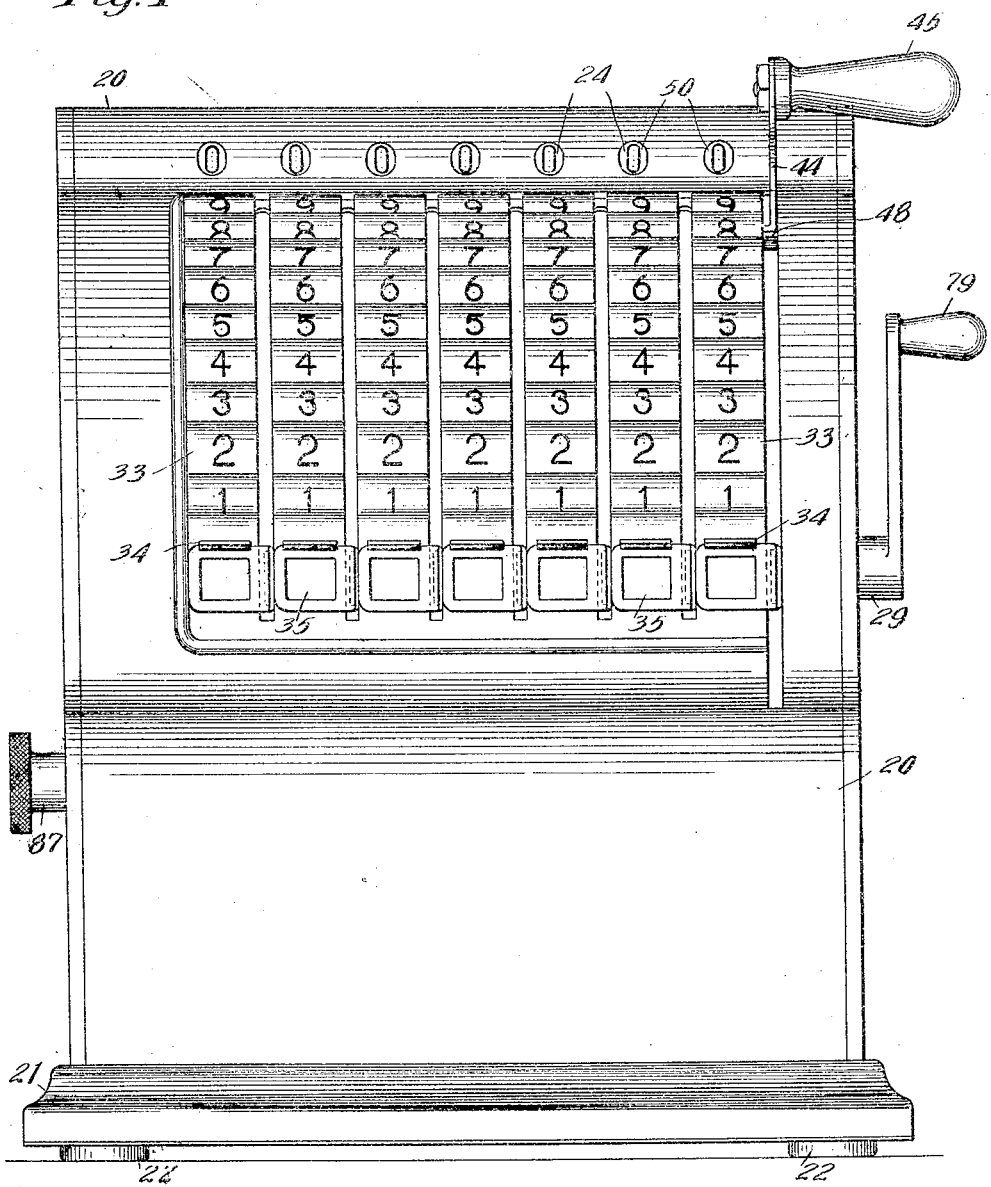
Figure 2:
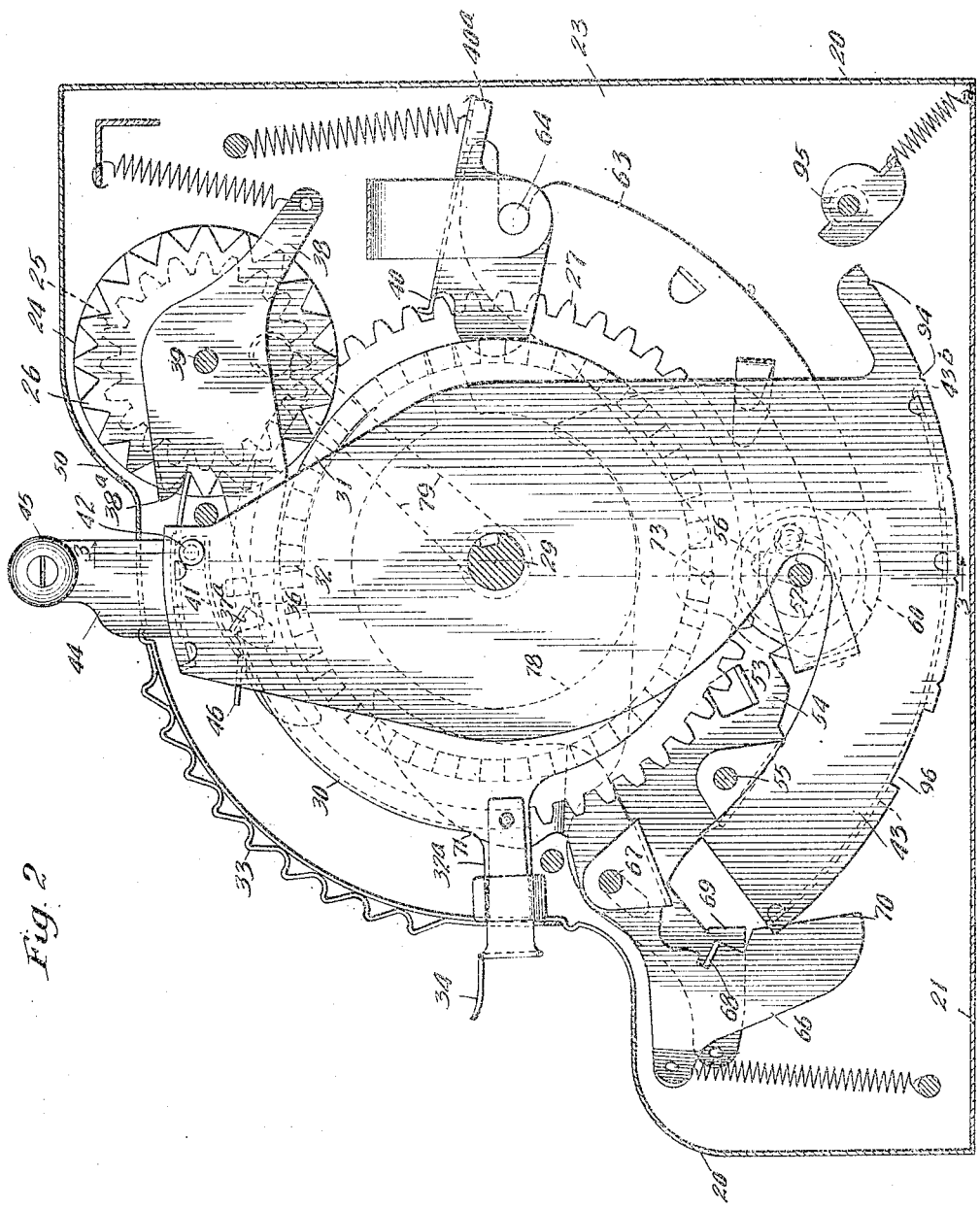
Figure 3:
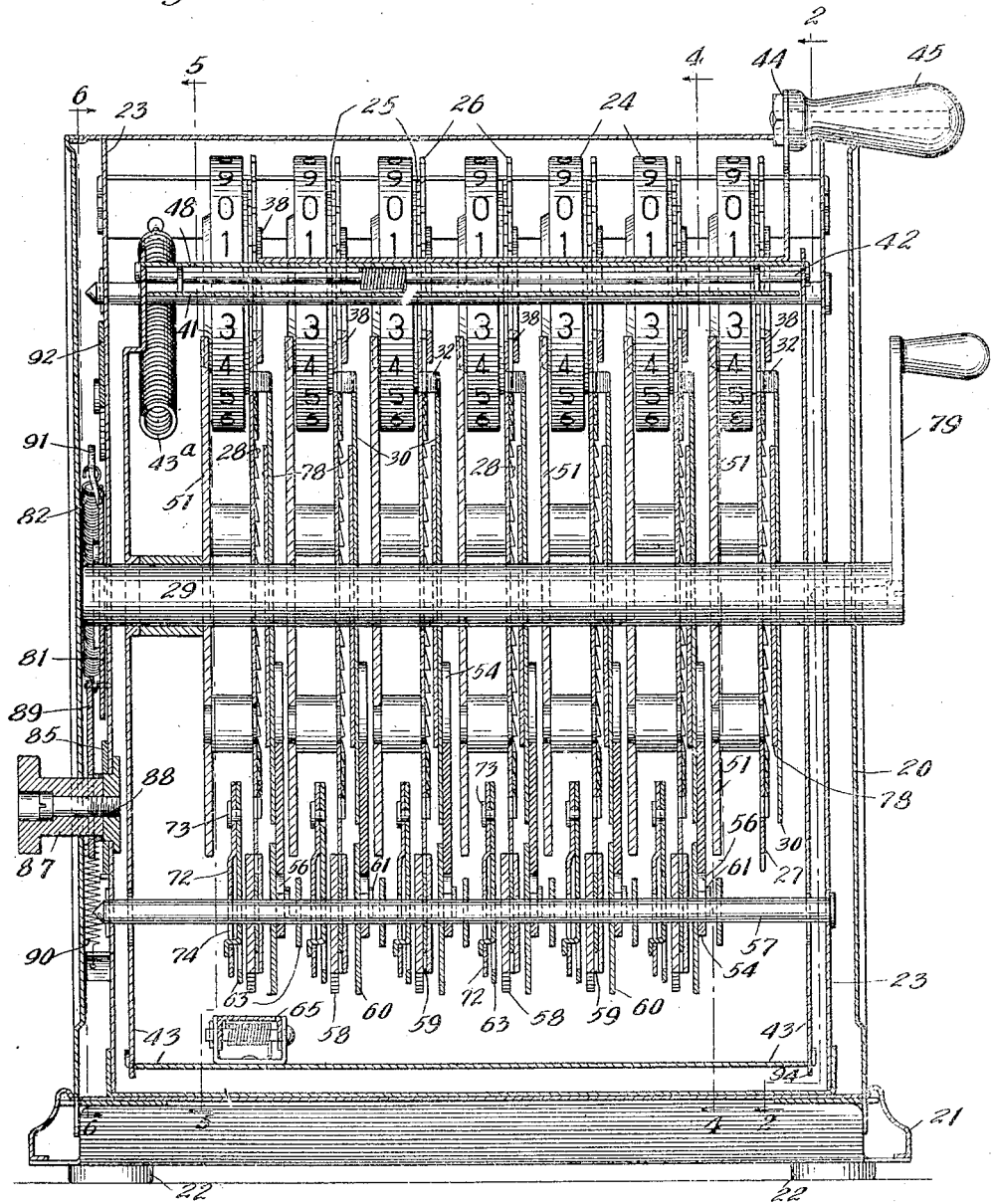

In the drawings forming a part of this specification, Figure 1 is a front elevation of a machine embodying my improvements showing all the parts at normal. Fig. 2 is a vertical, sectional view taken substantially on the line 2—2 of Fig. 3. Fig. 3 is a transverse, vertical, sectional view taken substantially on the line 3—3 of Fig. 2. Fig. 4 is a sectional view taken substantially on the line 4—4 of Fig. 3, parts being broken away to more clearly illustrate the mechanism. Fig. 5 is a transverse, vertical section taken substantially on the line 5—5 of Fig. 3. Fig. 6 is a vertical, sectional view taken substantially on the line 6—6 of Fig. 3. Fig. 7 is a plan view of the centering plate employed for accurately centering the register wheels and serving also other functions, as hereinafter described. Fig. 8 is a sectional view of a portion of the combined prime-actuating, carrying and canceling oscillating frame or yoke. Fig. 9 is a side view of one of the set-up levers. Fig. 10 is a detail view showing one of the transfer devices and immediate parts. Fig. 11 is a detail view of the gate employed in the transfer devices. Fig. 12 is a detail view of the combined cam and detent employed in the transfer devices. Fig. 13 is a detail view illustrating a portion of the transfer mechanism and part of the register-wheel actuating-connections. Fig. 14 is a detail, sectional view of a portion of the ratchet employed on the main gear and Fig. 15 is a detail view of one of the levers used in disconnecting the set-up levers from the register-wheel actuating-connections.

The various parts of the mechanisms are mounted within a suitable casing or outer shell 20 having a base 21 supported on cushion members 22, and within the outer shell or casing is mounted a frame 23, adapted to support the several parts. As more clearly shown in Figs. 1 and 3, the machine comprises seven orders, although it will be understood that the number of orders may be increased or diminished, as desired, by duplicating or omitting parts of some of the mechanisms, and inasmuch as a great many of the elements employed in each order or column are identical, I shall only describe the parts for one order or column except in so far as may be necessary to describe the elements which are common to all of the orders of the machine.

*Prime actuating mechanism.*—Referring now more particularly to Figs. 1, 2, 3, 4, 7, 8 and 9, it will be seen that each order of the machine comprises a register or indicating-wheel 24, having a gear 25 and a ratchet 26, the gear meshing with a major gear 27, which, as shown, is in the form of a disk, and has formed integral therewith a ratchet 28 (see Figs. 13 and 14), said gear 27 being rotatably mounted on a central, oscillatable shaft 29 extending transversely of the case. Also rotatably mounted on the shaft 29 adjacent each major gear 27 is a set-up lever 30, which, as more clearly shown in Fig. 9 is in the form of a disk having an integral spring arm 31 having a bent end 32, the latter being adapted to serve as a pawl and coöperating with the ratchet 28 to actuate the gear 27. The set-up lever 30 is provided with and arm 32ª which projects through a slot in the fingerboard 33 of the outer shell or case 20, said arm 32ª having detachably secured thereto a finger hold 34 having a recess 35 therein to permit the operator to see the numerals on the fingerboard 33. This fingerboard construction is fully described in patent issued to Harbeck, No. 1,036,614, dated Aug. 27, 1912. The disk of each set-up lever is provided with a notch 36 over which is normally positioned, when the set-up lever is at normal, an off-set arm 37 having a cam 37ª formed on the spring-controlled clearing-bar pawl 38 pivotally mounted on the shaft 39, the latter serving also as the supporting shaft for the register-wheels. The amount added in each order is determined by the extent to which the set-up lever is raised upwardly over the fingerboard, the set-up levers being thus the key-element of the machine, and in lifting the set-up lever, the pawl 32 thereof will ride over the ratchet 28, since the latter is prevented from backward rotation by means of a pivoted dog 40 that engages the gear 27, and which is mounted on a transversely extending rod 64. When the set-up lever is raised, the clearing bar pawl 38 will be raised, owing to the cam face 37ª thereof being engaged by the corner 39ª and the pawl 38 will in turn lift the clearing-bar 41 pivotally mounted on the rod 42 extending entirely across all the orders of the machine and rigidly mounted in the combined prime-actuating, carrying and canceling yoke bar or frame 43, the latter being pivotally mounted on the shaft 29, and having an outwardly extended arm 44 to which is secured the operating handle 45. The clearing bar is or may be spring-controlled, in the construction illustrated being pressed downwardly by a spring 97 coiled around the rod 42 (Figs. 3 and 4). When the clearing bar 41 is thus raised, a projection 46 thereon (see Fig. 7) will ride over the outside of a cam track 47 (see Fig. 5), which prevents clearing of the machine, as will be hereinafter described, this raising or lifting of the clearing bar occurring every time that a set-up lever is manipulated. When a set-up lever has been set to the amount desired to be added in a particular column, and the clearing bar thereby raised, as hereinbefore described, the operator grasps the handle 45 and oscillates the frame or yoke 43, whereupon the set-up levers will be engaged by the plate 48 which extends across all of the columns or orders of the machine, said plate 48 being rigidly secured to the frame or yoke 43, thereby returning all the set-up levers which may have been raised, to normal; and the pawls on the set-up levers in turn rotating the major gears 27, which in turn actuate the register-wheels an amount corresponding to the amount set up by the set-up levers. When the oscillatable yoke or frame is returned to its normal or upright position by means of the retracting spring 43ª, the plate 48, which, as shown in Fig. 7, is provided with a plurality of projections 49 on its rear edge, will engage the ratchets 26 of the register wheels and center the same so that the numerals or other indicating marks will be properly alined with the apertures 50 in the casing, and through which the amounts indicated on the register-wheels are adapted to be read. Said projections 49 in coöperation with the clearing-bar-pawls 38 also serve another important function. As shown in Figs. 2 and 4, each clearing-bar-pawl has a cam face 38ª which is engaged by a projection 49 when the latter returns to normal, which causes the clearing-bar-pawl to be raised to neutral or normal position, as shown in said figures. When, however, the yoke 43 is moved from normal, the clearing-bar pawls in those orders of the machine which have not been lifted by movements of the set-up levers, will be allowed to have their off-set arms 37 fall into the notches 36 of said set-up levers, thereby locking said set-up levers and preventing the same from being raised while the yoke or frame 43 is in any other position than normal.

*Transfer devices.*—Referring now more particularly to Figs. 2, 4, 5 and 10 to 13, inclusive, it will be seen that rigidly secured to each of the major gears 27 is a disk 51 provided with a plurality of projections 52, the number of said projections corresponding to the number of teeth on the major gear, there being one of such projections for each ten teeth of the gear. As each gear 27 is rotated an amount corresponding to ten units, one of said projections 52 will engage an offset 53 formed integral with a spring-controlled, gate-actuator 54 pivotally mounted on a transversely extending shaft 55 (see Fig. 10). Said gate-actuator 54 has provided therein a T-shaped slot 56, through one portion of which extends a transversely arranged shaft 57 on which are mounted the transfer-wheels, each transfer-wheel comprising a ratchet disk 58 and a gear 59, the latter engaging with a major gear 27 of the next succeeding higher order or column than that in which the gate-actuator disk is located. Also mounted on the shaft 57 and adjacent the transfer-wheel is a gate 60 having a pin 61 which engages in another portion of said T-shaped slot 56. When the parts are at normal, the gate-actuator 54, transfer-wheel and gate are in the position shown at the lower part of Fig. 4, but upon one of the projections 53 engaging the gate-actuator, the parts are moved to the position shown in Fig. 10, which, as will be noted, causes the gate 60 to be oscillated on the shaft 57. Said gate 60 when in normal position, closes an opening or recess 62 formed in a partition or bracket 63 rigidly mounted on the shaft 57 and the upper, transversely extending shaft 64, and when the gate is in such position the spirally arranged, spring controlled, pivoted carrying-pawls 65, mounted on the lower end of the frame or yoke 43, are prevented from engaging the teeth of the ratchet 58 when the yoke or frame is on its return stroke. When, however, the gate is opened or actuated, the pawl 65 will engage the ratchet 58 and rotate the same a tenth of a revolution, which, as will be obvious, will rotate the major gear with which the transfer-wheel gear engages, a corresponding amount. The gate and gate-actuators are of course operated during the down stroke of the yoke or frame 43, and the carrying or transferring is accomplished on the return stroke, and it becomes necessary to keep the gate open until the carrying pawls 65 have had opportunity to operate the transfer wheels and such means are provided in the spring controlled, pivoted, gate-actuator-controller 66, the latter being supported on a fixed, transversely extending shaft 67. Said controller is provided with a projecting flange 68 which is adapted to catch beneath a coöperating, projecting flange 69 formed on the gate-actuator 54 when the latter has been operated by a projection 52 (see Fig. 4), and adapted to hold the gate-actuator against the tension of its spring until after the transferring or carrying operation has taken place. Said controller may be released in one of two ways, either by the yoke or frame 43 which, on its return stroke, engages a depending projection 70 on the controller (see Fig. 4) or by means of the canceling or clearing bar 41, which is adapted to engage a cam face 71 also formed on the controller 66, the latter operation taking place during a canceling stroke only.

In order to prevent overthrow of the transfer-wheel during the carrying operation, a detent 72, yieldingly controlled by springs 76, is provided (see Fig. 12), which is in the form of a segment pivotally mounted, as at 73, on the bracket 63, said detent being provided with a slot 74 for clearing the shaft 57, and having also a projecting lip 75 movable in a slot 75ª in the bracket 63 and which engages the ratchet 58 of the transfer-wheel when said detent is moved against the tension of its spring by means of the coöperating carrying dog 65 that engages a cam face 77 thereon. The cam face 77, as shown, is longer than the face or edge 62ª of the opening 62, whereby the detent 72 will be held in engagement with the ratchet 58 for an appreciable time after the carrying dog 65 has passed by the opening 62, which will provide sufficient time for the shock on the transfer wheel to be dissipated, thus preventing overthrow of the transfer-wheel, said cam face 77 operating finally to disengage the carrying-pawl from the transfer devices as the return stroke of the yoke is continued.

*Clearing or canceling means.*—When all the sums desired have been accumulated on the register-wheels, and no further additions are to be made, the set-up levers will of course all be at normal and the sum accumulated on the register-wheels can be canceled by oscillating the yoke or frame 43. When all the set-up levers are at normal, all the clearing-bar-pawls 38 will be in their lowered or normal position, which will allow the clearing bar 41 to ride with its projection 46 beneath the cam track 47, and as the clearing bar 41 is moved, it will engage or pick up the projections 52 on the disks 51, thereby rotating all of said disks and the gears connected therewith to a position where the register-wheels will all indicate zero.

*Means for disconnecting the set-up levers from the prime-actuating mechanism.*—In practice, it is found that the operator occasionally makes an error in setting up the set-up levers, and it is desirable to correct such error without the necessity of canceling the amount which may be already accumulated on the register-wheels, and I have provided such means in the following devices. By referring to Figs. 2, 3, 4 and 15, it will be seen that mounted between each set-up lever disk and major gear is a releasing lever 78 which is in the form of a disk keyed to the shaft 29, the latter extending to the outside of the case, and having a crank arm 79 by which the shaft may be oscillated as desired. Each lever 78 is extended so as to come between the pawl 32 on the set-up lever 30 and the ratchet 28 so that when the lever 78 is rotated counter-clockwise, as viewed in Fig. 4, the same will release the pawl from the ratchet and by engaging a projection 80 formed on the set-up lever disk, the latter may be returned to normal without actuating the ratchet 28, and thereby preventing the gear 27 from actuating its register-wheel. The release levers 78 are normally held in the position shown in Figs. 2 and 4 by means of disk 81 secured to the shaft 29 at the end opposite to that to which the crank 79 is secured, said disk 81 having connected thereto a spring 82 having one end secured to a rigid part of the frame (see Fig. 6).

*Locking mechanism.*—It sometimes occurs that an operator will have performed only a part of a sum and will have to leave the machine, in which case it becomes desirable to lock the machine and prevent tampering with the sum accumulated on the register-wheels, and such locking means are provided by the following parts, shown more clearly in Figs. 3 and 6. As previously described, the releasing levers 78 and the shaft 29 to which said levers are keyed, are held in normal position by means of the spring 82 which is attached to the disk 81, the latter having a stop 83 engaging a projection 84 on the frame of the machine. By rotating the shaft 29 and the releasing levers 78 so that the latter engage the projections 80 on the set-up levers when the same are at normal, and holding the releasing levers in such position, it will be apparent that the set-up levers cannot be manipulated, and to hold the releasing levers in such position a pivoted locking member 85 is provided, which is adapted to engage a projection 86 formed on the disk 81 when the parts are in the position shown in dotted lines in Fig. 6. The locking member 85 is rigidly secured to a rotatable knob 87, mounted on screw 88, and has pivoted thereto a slotted plate 89, the latter having connected thereto a spring 90 which will hold said plate 89 in either the position shown in full line in Fig. 6, or the position shown in dotted line, thus being adapted to hold the locking member 85 in either of its extreme positions. When the disk 81 is rotated, the arm 91 thereon is adapted to engage a pivoted member 92, which has a flange 93 thereon that, when raised, forms a continuation of the cam track 47 for the projection 46 of the clearing bar, and as will be obvious, when said member 92 is raised, it will lift with it the clearing bar projection 46, which in turn will prevent the clearing bar from engaging the projections on the disks 51, should the yoke or frame 43 be oscillated. If this latter precaution were not taken, an oscillation of the yoke or frame would clear the machine, even though the set-up levers were locked.

*Other details of construction.*—In order to prevent a partial stroke of the oscillating yoke or frame 43, the latter is provided with a plurality of notches 94 at the bottom (see Fig. 2) which will be engaged by a double-acting, pivoted pawl 95 after the yoke or frame has been started in its downward stroke, said pawl acting to prevent the yoke from returning after the first notch 94 has engaged the pawl 95 and only allowing the yoke to return after the same has been given a full stroke and the elongated recess 96 has passed by the pawl, thereby allowing the pawl to return to normal position and causing the same to act as a detent on the yoke 43 during its return stroke, that is, to prevent the yoke from being depressed again, after it has once been started on its return stroke, until after the yoke has completed its full return stroke.

Referring again to the plate 48 and the projections 49 thereon, it will be seen that the latter, by engaging the ratchets 26, will lock the register-wheels and prevent the same from being operated by attempted manipulations of the set-up levers independent of the oscillatable yoke.

By referring to Figs. 2 and 4, it will be seen that the pawls 40 which engage the gears 27 are so located that the tail pieces 40ª thereof will be engaged by the rear edge 43ᵇ of the yoke at the end of the down-stroke of the latter, thereby preventing overthrow of the gears 27 and the register wheels.

Many of the parts are so arranged that the same can be easily assembled by stringing the duplicate parts on the several transversely extending shafts and rods, thereby minimizing the cost of labor for assembling.

Although I have herein described and shown the construction which I now consider preferable, as embodying my improvements, yet it will be obvious to those skilled in the art, that various changes and modifications may be made in the different parts and combinations of parts without departing from the spirit of the invention, and all such changes and modifications are contemplated as come within the scope of the claims appended hereto.

I claim:—

1. In a multiple-order calculating machine having registering mechanism and transferring devices, an eccentric oscillatable means, common to and extending across all the orders of the machine and engageable with an operative key-element of each order during one stroke, for effecting the prime movements of the registering mechanism during one portion of its movements, and means carried by said eccentric oscillatable means adapted to positively actuate the transferring devices during another portion of its movements.

2. In a multiple-order calculating machine having registering mechanism and transferring devices, an eccentric oscillatable means, common to and extending across all orders of the machine and engageable with an operative key-element of each order during one stroke, for effecting the prime movements of the registering mechanism during a stroke in one direction, and means carried by said eccentric oscillatable means adapted to positively actuate the transferring devices on its return stroke.

3. In a multiple-order calculating machine, in combination; registering mechanism; transfer devices; and oscillating means, common to all the orders of the machine, for effecting the prime-movements of the registering mechanism and means carried by said oscillatable means for separately and positively actuating the transfer devices, said actuating means including a plurality of carrying pawls mounted on said oscillating means.

4. In a multiple-order calculating machine having register-wheels and transferring devices, an oscillatable means, common to all the orders of the machine, for effecting the prime-movements of the register-wheels during a stroke in one direction and devices on said oscillating means for actuating the transfer devices on the return stroke, said devices including a plurality of spirally arranged carrying pawls.

5. In a multiple-order calculating machine having register-wheels and transfer devices and a lever in each order thereof for setting up the amounts to be added, an oscillatable means comprising a part acting on all of said levers which have been set up and adapted to effect the prime-movements of the register-wheels and having means to actuate the transfer devices in one complete oscillation, and also having means to clear by a subsequent oscillation an amount accumulated on the register-wheels, when all the set-up levers are at normal.

6. In a multiple-order calculating machine having register-wheels and transfer devices and a lever in each order thereof for setting up the amounts to be added, oscillatable means, common to all the lever-set orders of the machine, for effecting the prime-movements of the register-wheels on one stroke and devices carried by said oscillatable means for actuating the transfer devices on the return stroke and adapted also to clear, by a subsequent oscillation, when all of the set-up levers are at normal, an amount accumulated on the register-wheels.

7. In a multiple-order, lever-set calculating machine, in combination: a series of register-wheels and actuating connections therefor; a series of set-up levers; transfer devices; and oscillatable means, including a plurality of spirally arranged carrying pawls, for effecting the prime-movements of the register-wheels and actuating the transfer devices by one complete oscillation, and for clearing by a subsequent oscillation, when all of the set-up levers are at normal, an amount accumulated on the register-wheels.

8. In a multiple-order calculating machine, the combination of a totalizer having transferring devices, finger levers for setting up the numbers to be entered into the machine, an oscillatable yoke common to all of the finger levers for returning all of the set levers to normal position and simultaneously introducing the numbers into the totalizer, said yoke effecting the prime movements of the registering mechanism and having means adapted at another time to separately and positively actuate said transferring devices.

9. In a multiple-order calculating machine, the combination of a totalizer having a transfer mechanism, finger levers for setting up the numbers to be entered into the machine, an oscillatable yoke common to all of the finger levers for returning all of the set levers to normal position and simultaneously introducing the numbers into the totalizer, said yoke effecting the prime movements of the registering mechanism during a stroke in one direction and having means adapted to actuate the transfer mechanism during the return stroke.

10. In a multiple-order, lever-set, adding machine, in combination: a series of register-wheels and actuating-connections therefor; a series of set-up levers; transfer devices; an oscillatable yoke, common to all the lever-set orders of the machine, for effecting the prime-movements of the register-wheels and having means mounted thereon for separately and positively actuating the transfer devices; and mechanism, optionally operative, for disconnecting the set-up levers from operative relation with the register-wheel actuating-connections and adapted to return the set-up levers toward normal position.

11. In a multiple-order, lever-set, adding machine, in combination: a series of register-wheels and actuating connections therefor; a series of set-up levers; transfer devices; oscillatable means, common to all the lever-set orders of the machine, for effecting the prime-movements of the register-wheels during a stroke in one direction and for actuating the transfer devices on the return stroke; and mechanism, independent of said oscillatable means and optionally operative, for disconnecting the set-up levers from operative relation with the register-wheel actuating connections and adapted to return the set-up levers toward normal position.

12. In a multiple-order, lever-set, adding machine, in combination: a series of register-wheels and actuating connections therefor; a series of set-up levers; transfer devices; oscillatable means adapted to effect the prime-movements of the register-wheels and to actuate the transfer devices in one complete oscillation and to cancel, by a subsequent oscillation, an amount accumulated on the register-wheels, when all the set-up levers are at normal; and mechanism, independent of said oscillatable means and optionally operative, for disconnecting the set-up levers from operative relation with the register-wheel actuating connections and adapted to return the set-up levers toward normal position.

13. In a multiple-order, lever-set, adding machine, in combination: a series of register-wheels and actuating connections therefor; a series of set-up levers; transfer devices; oscillatable means, common to all the lever-set orders of the machine, for effecting the prime-movements of the register-wheels and for separately and positively actuating the transfer devices; means for canceling an amount accumulated on the register-wheels, and mechanism, independent of said oscillatable means and optionally operative, for disconnecting the set-up levers from operative relation with the register-wheel actuating-connections and adapted to return the set-up levers toward normal position.

14. In a multiple-order, lever-set, adding machine, in combination: a series of register-wheels and actuating connections therefor; a series of set-up levers having a common axis; transfer devices, oscillatable means, common to all the lever-set orders of the machine, for effecting the prime-movements of the register-wheels and for separately, positively actuating the transfer devices; and locking mechanism acting after said oscillatable means has begun its adding movement and adapted to prevent movement of the set-up levers from normal.

15. In a multiple-order, lever-set, adding machine, in combination: a series of register-wheels and actuating connections therefor; a series of set-up levers having a common axis; transfer devices; oscillatable means, common to all the lever-set orders of the machine, for effecting the prime-movements of the register-wheels and for separately, positively actuating the transfer devices; mechanism, independent of said oscillatable means and optionally operative, for disconnecting the set-up levers from operative relation with the register-wheel actuating-connections and adapted to return the set-up levers toward normal position; and a lock coöperating with said mechanism and acting after said oscillatable means has begun its adding movement and adapted to prevent movement of the set-up levers.

16. In a multiple-order calculating machine, transferring devices including an oscillatable yoke having a plurality of spirally arranged, carrying pawls thereon, one pawl for each order of the machine, said pawls being so arranged that the one for the lowest order of the machine operates prior to the pawl for the next higher order of the machine and so on to the pawl of the highest order of the machine which operates last.

17. In a multiple-order calculating machine, a registering mechanism, transferring devices for each order of the machine including a transfer wheel having a ratchet, a carrying pawl adapted to engage the ratchet, a gate along which the pawl may travel and normally preventing the pawl from engaging the ratchet, and means for moving said gate to an inoperative position when a transfer is to be effected from that particular order of the machine to the next higher order.

18. In a calculating machine of the character described, a registering mechanism, transfer devices for each order of the machine including a transfer wheel having a ratchet, an oscillatable frame having a carrying pawl thereon adapted to engage said ratchet and rotate the same, a gate along which the pawl may travel and which is normally in position to prevent said pawl from engaging said ratchet, a gate-actuator for moving said gate to an inoperative or open position and means for holding said gate in its open position until after the pawl has engaged and operated the ratchet.

19. In a multiple-order calculating machine, an oscillatable set-up lever for each order having normal operative connection with the registry mechanism on its return movement, the amount which said levers are moved determining the amount to be added, and means for returning said set-up levers to normal position without bodily movement of or effecting any operation of the registering mechanism, to thereby permit errors in moving said set-up levers to be corrected.

20. In a multiple-order calculating machine, a plurality of oscillatable set-up levers, one for each order of the machine and each having a portion by which it is manipulated, an oscillatable frame adapted to engage said set-up levers when it is oscillated to thereby effect the prime actuations of the registering mechanism, said oscillatable frame being adapted also to cancel amounts accumulated on the registering mechanism when it is oscillated in the same direction as when it effects the prime actuations, and means operated by said set-up levers when the latter are moved from normal, for preventing the canceling operation to take place.

21. In a multiple-order calculating machine, in combination: a supporting shaft common to a plurality of the orders of the machine; ordinal mechanisms each comprising a gear on said shaft having a ratchet, and a set up and driving lever on said shaft for each ratchet and having a pawl for engaging the ratchet; an eccentric oscillatable means mounted on said shaft for driving the set-up levers of the various orders; and ordinal register wheels actuated by the said gears.

22. In a multiple-order calculating machine, in combination: a supporting shaft common to a plurality of the orders of the machine; ordinal driving mechanisms each comprising a gear on the said shaft having a ratchet, and a set up and driving lever for each ratchet and having a pawl for engaging the ratchet; an oscillatable bar mounted on said shaft for driving the set-up levers of the various orders; ordinal register wheels actuated by the said gears; and means for separating the pawls from the ratchets to allow the set up levers to be returned to normal without operating the register wheels.

23. In a multiple-order calculating machine, in combination: ordinal register wheels; ordinal driving and carrying mechanisms therefor; an oscillatable yoke common to a plurality of the ordinal mechanisms; an oscillatable key-element for each order with which the said yoke is engageable on one stroke but at different times and for different distances as may be required for effecting the additional movements of the register wheels; and means mounted on said yoke whereby the said frame operates the carrying mechanism.

24. In a multiple-order calculating machine, in combination: ordinal register wheels; ordinal driving and carrying mechanisms therefor; clearing devices; an oscillatable bar common to a plurality of the ordinal driving mechanisms; an oscillatable key-element for each order with which the said bar is engageable on one stroke but at different distances as may be required, for effecting the additive movement of the register wheels; and means whereby the said bar is caused, on another stroke, to engage and operate the clearing devices.

25. In a multiple-order calculating machine having registering mechanism and transferring devices, oscillatable key-elements for actuating the registering mechanism, an oscillatable means common to all of the orders of the machine for effecting the prime movements of the key-elements and registering mechanism during one portion of its movement and adapted to positively actuate the transferring devices during another portion of its movement, and ordinal series of spaced finger-holds arranged in connection with said key-elements, against any one of which finger-holds the operator's finger may rest to serve as a variable determinant stop in the manipulation of said key-elements.

26. In a multiple-order calculating machine, in combination: a supporting shaft common to a plurality of the orders of the machine; ordinal mechanisms each comprising a gear having a ratchet, and a set-up and driving lever having a pawl for engaging the ratchet; an eccentric oscillatable yoke for driving the set up levers of the various orders; ordinal register wheels actuated by the said gears; and spaced finger-holds against any one of which the operator's finger may rest to serve as a variable determinant stop in the manipulation of said set up levers.

27. In a multiple-order calculating machine, in combination: a supporting shaft common to a plurality of the orders of the machine; ordinal driving mechanisms each comprising a gear on the said shaft having a ratchet, and a set up and driving lever having a pawl for engaging the ratchet; a yoke for driving the set up levers of the various orders; ordinal register wheels actuated by the said gears; means for separating the pawls from the ratchets to allow the set up levers to be returned to normal without operating the register wheels; and spaced finger-holds against any one of which the operator's finger may rest to serve as a variable determinant stop in the manipulation of said set-up levers.

28. The combination of orders of registering mechanism; corresponding oscillatable set-up levers one for each order of registering mechanism, an oscillating yoke extending across the planes in which the said set-up levers operate and engageable with the said set-up levers, and means for locking the set-up levers in normal position, said yoke having means for releasing said locking means when the yoke is in normal position.

29. In a multiple order calculating machine, a registering mechanism having transfer devices, an oscillatable yoke, common to all the orders of the machine, having means for effecting the prime movements of the registering mechanism at one time and having means adapted at another time to separately and positively actuate the transferring devices, the axis of the yoke coinciding substantially with the axis of the orders of register actuating mechanism.

30. In a multiple-order calculating machine, a registering mechanism having transferring devices, an oscillatable yoke, common to all the orders of the machine, for effecting the prime movements of the registering mechanism during a stroke in one direction, and means carried by the yoke for centering the numeral wheels of the said orders.

31. In a multiple-order calculating machine, in combination: orders of registering mechanism; corresponding orders of register actuating mechanism constantly geared with the registering mechanism and having set up levers; means actuated by the set up levers for clearing the register wheels, said clearing means being inoperative except at the normal position of the set up levers; and a yoke for giving additive movement to the set up levers when set, and for giving clearing movement to the set up levers when in normal position.

32. In a multiple order calculating machine, in combination: orders of registering and actuating mechanism each having a forwardly extending set-up finger lever; register-clearing mechanism; and a combined adding and clearing lever having means for giving additive movement to said registering mechanism and for operating said clearing mechanism.

33. In a multiple order calculating machine, in combination: registering mechanism; set-up finger levers therefor having a rearward set-up movement and a forward additive movement; and a combined adding and clearing yoke engageable with all of said set-up levers and having a hand lever and having a forward additive movement and a forward clearing movement.

34. In a multiple order calculating machine, in combination: registering mechanism; set-up levers therefor having a rearward set-up movement and a forward additive movement; transfer mechanism; and a frame engageable with all of said set-up levers and having a hand lever, and having a forward additive movement, and a rearward transfer movement to actuate said transfer mechanism.

35. In a multiple order calculating machine, in combination: registering mechanism; master gears for actuating the same; set-up levers; means for engaging together each set-up lever and its master gear; release levers for releasing said engaging means, a yoke for actuating said set-up levers; and a shaft supporting side by side said master gears, set-up levers, release levers and yoke.

36. In a multiple order calculating machine, in combination: registering mechanism; master gears for actuating the same; ratchets on said master gears; set-up levers having pawls engaging said ratchets; release levers for disengaging said pawls; a yoke for actuating said set-up levers; and a shaft supporting said master gears, set-up levers, and release levers and yoke.

37. In a multiple order calculating machine, in combination: registering mechanism; master gears for actuating the same; set-up levers; means for engaging together each set-up lever and its master gear; transfer disks; release levers for releasing said engaging means; a yoke for actuating said set-up levers; and a shaft supporting side by side said master gears, set-up levers, transfer disks, release levers, and yoke.

WILLIAM M. HOLLOWAY.

Witnesses:
PEARL ABRAMS,
JOSEPH HARRIS.